(12) United States Patent
Resnick

(10) Patent No.: US 6,580,603 B1
(45) Date of Patent: Jun. 17, 2003

(54) STRUCTURE FOR MOUNTING COMPUTER DEVICES, PIVOTABLE BETWEEN OPERATING AND SERVICE POSITIONS, INCLUDING A PIVOTING SUPPORT MEMBER

(75) Inventor: Russell Alan Resnick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/998,740

(22) Filed: Nov. 30, 2001

(51) Int. Cl.[7] .................................................. G06F 1/16
(52) U.S. Cl. ...................... 361/683; 361/686; 312/223.1
(58) Field of Search ......................... 361/679, 683–686, 361/724–727; 312/223.1–223.3

(56) References Cited

U.S. PATENT DOCUMENTS

| 4,268,100 A | 5/1981 | Kekas et al. |
|---|---|---|
| 5,172,305 A | 12/1992 | DeWilde |
| 5,495,389 A | 2/1996 | Dewitt et al. |
| 5,572,402 A | 11/1996 | Jeong |
| 5,784,251 A | 7/1998 | Miller et al. |
| 5,784,252 A | 7/1998 | Villa et al. |
| 5,973,918 A | 10/1999 | Felcman et al. |
| 5,995,364 A | 11/1999 | McAnally et al. |

*Primary Examiner*—Gerald Tolin
*Assistant Examiner*—Yean Hsi Chang
(74) *Attorney, Agent, or Firm*—Ronald V. Davidge

(57) ABSTRACT

A computing system includes a pivoting mounting structure for mounting one or more electronic devices. The mounting structure is itself mounted to pivot between an operating position, within the computing system, and a service position, with the pivoting mounting structure extending outside the computing system for the installation or removal of electronic devices. A support member, mounted to pivot on the mounting structure, is manually moved between an extended position, in which the frame of the computing system is contacted to prevent movement of the mounting structure away from the service position past the operating position, and a retracted position, in which the mounting structure can be moved between the operating and service positions without contact between the support member and an adjacent structure.

8 Claims, 1 Drawing Sheet

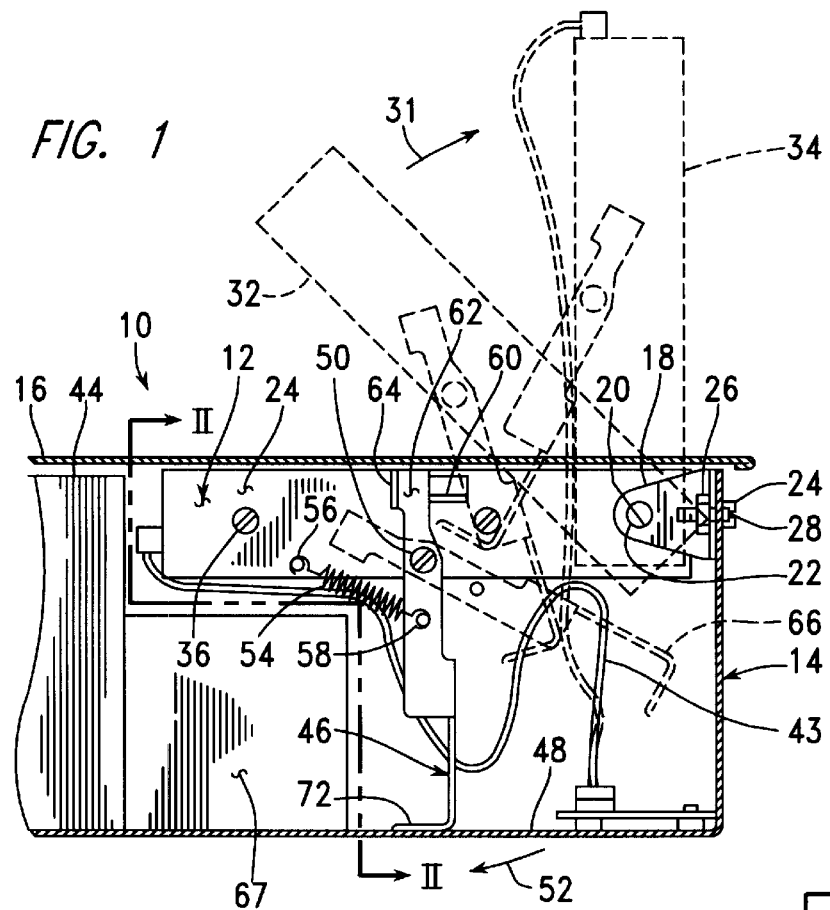
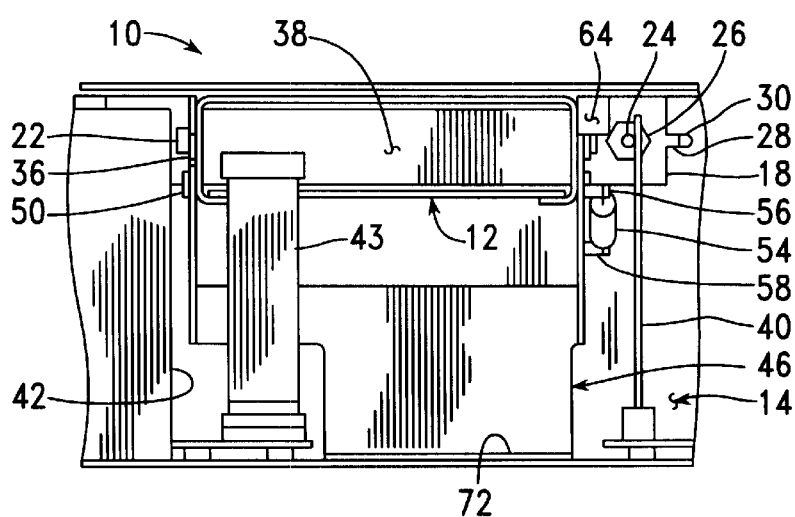
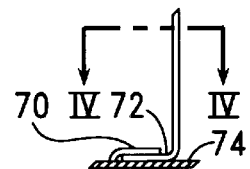
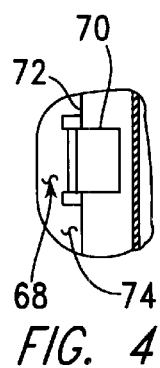
FIG. 1
FIG. 2
FIG. 3
FIG. 4

STRUCTURE FOR MOUNTING COMPUTER DEVICES, PIVOTABLE BETWEEN OPERATING AND SERVICE POSITIONS, INCLUDING A PIVOTING SUPPORT MEMBER

CROSS-REFERENCE TO A RELATED APPLICATION

This application is related to a co-pending U.S. application, Ser. No. 09/708,349, filed Nov. 8, 2000, having a common assignee with the present invention, the disclosure of which is hereby incorporated by reference. This copending application describes a computing system including a frame and a drive mounting structure for mounting one or more drive units within the computing system, with the drive mounting structure being pivotally and removably mounted on the frame to move between an operating position, in which an internal end of a drive unit mounted within the drive mounting structure is held within the computing system, and a service position, in which the internal end of the drive unit extends outward from the computing system.

BACKGROUND INFORMATION

1. Field of Invention

This invention relates to a cage or bracket for mounting one or more electronic devices within a computer, particularly to such a cage or bracket pivotable between an operating position, in which the electronic devices are held in place within the computer, and a service position, in which the electronic device(s) is/are moved outward from the computer for removal or installation, and, more particularly, to such a cage or bracket including a pivoting bracket supporting the cage or bracket in its operating position.

2. Description of the Related Art

Typical computer systems include a number of device bays, in which drive devices are mounted by installation from the front of the system. Such drive devices, which are often called DASD (Direct Access Storage Device) drives, include floppy disk drives, hard disk drives, and CD ROM drives. Often, these bays do not provide access to insert screws to engage the threaded mounting holes provided within the drive devices. While these mounting holes are typically provided along the left and right sides of the drive device, and often also along the bottom surface of the drive device, in many computing systems the bays only provide for attachment access from the front of the system. In many computer systems, drives are mounted in a side-by-side arrangement, preventing access to the screw holes on the side of each drive adjacent the other drive. Therefore, a number of adapters have been devised to fasten to various of the threaded mounting holes of a drive device, with the device attached to the adapter being installed from the front of the computer system. For example, a slide may be screwed to each side of a drive device, with the frame surfaces forming the drive bay being adapted to provide recesses for sliding engagement with the slides on opposite sides of the drive device.

What is needed is a structure, such as a cage, for mounting a drive, with the structure itself being pivotable from an operating position, in which it is held closely among adjacent structures of the computing system by means of a bracket extending to contact the frame, and a service position, in which access to the screws mounting the drive within the structure is provided. In particular, it is desirable to provide such a bracket, supporting the structure in the operating position, which is pivotable to clear adjacent devices as the structure is pivoted out of the operating position.

U.S. Pat. No. 5,995,364 describes a bracket for mounting a disk drive, in which the mounting bracket is pivotally mounted within a computer frame. As the mounting bracket is moved into its operating position, surfaces of the mounting bracket are brought into contact with the frame.

U.S. Pat. No. 5,572,402 describes a hard disk drive mounting assembly that extends vertically in an operating position within a computer frame at an opening in the frame. The mounting assembly is pivoted into a service position through an oblique angle to extend outward through the opening in the frame. The mounting assembly is held within its service position by means of a pair of spring catches mounted at opposite sides of the mounting assembly, which are accessible from outside the computer to release the mounting assembly.

A number of other patents, including U.S. Pat. Nos. 5,172,305, 5,495,389, 5,784,251, 5,784,252, and 5,973,918 describe methods for making relatively large portions of a computer system, including, for example, adjacent external covers of the system, pivot open to provide access to various structures within the computer system. These pivotable portions may include hard disk drives, power supplies, etc. In U.S. Pat. No. 5,495,389, the pivotable assembly is held in its closed or operational position by means of a locking pawl mounted on the frame and pivoted by a key lock.

U.S. Pat. No. 4,268,100 describes a printed circuit board holder including an integral, generally rectangular board receptacle which is pivotally supported above the base of a data processing device by spaced cradle posts. An integral latch mechanism keeps the holder in the normal (operating) position until the latch is manually released by outward deflection.

When the circuit board holder of U.S. Pat. No. 4,268,100 is brought into its closed or operating position, a number of connector spring contacts are brought into contact with pins extending outward from a mother board. The latches then prevent movement of the circuit board holder toward the open position, away from the mother board. In U.S. Pat. No. 5,973,918, a power supply connection is made as the pivotable structure is closed. In each of the systems of the other patents described above, the pivotable structure comes to rest along various surfaces of the frame. What is needed is a pivoting member, attached to a pivoting structure such as a drive mounting bracket, with the pivoting member contacting the frame in an extended position, and with the pivoting member being movable inward, toward the pivoting structure, to allow clearance for other devices mounted to the frame as the pivoting structure is pivoted upward. Such a configuration would allow the installation of a device, such as a disk drive, in a location extending over other devices attached to the frame, without a need to modify the frame to provide a downstop function for the pivoting structure.

SUMMARY OF THE INVENTION

In accordance with a first aspect of the invention, apparatus for holding a device within a computing system having a frame is provided. The apparatus includes a device holding structure for holding the device, a mounting structure pivotally mounting the device holding structure within the frame, and a support member pivotally mounted on the device holding structure. The device holding structure is mounted to move in a first pivoting direction between an operating position within the frame and a service position. The device holding structure extends outward from the frame in the service position. The support member is mounted to move on the device holding structure in a second pivoting direction between an extended position and a retracted position. The support member in the extended position extends to contact a surface of the frame to prevent movement of the device holding structure opposite the first pivoting direction past the operating position. The support member is moved toward an adjacent surface of the device holding structure into the retracted position. Preferably, the second pivoting direction is opposite the first pivoting direction.

BRIEF DESCRIPTION OF THE FIGURES

FIG. 1 is a fragmentary cross-sectional side view of a computer system including a disk drive mounting structure built in accordance with the present invention;

FIG. 2 is a fragmentary cross-sectional rear view of the computer system of FIG. 1, taken as indicated by section lines II—II therein;

FIG. 3 is a fragmentary cross-sectional side view of a tab within a pivoting support bracket of the disk drive mounting structure of FIG. 1 engaging a computer system frame in accordance with a variation of the present invention; and FIG. 4 is a fragmentary cross-sectional plan view of the tab and frame of FIG. 3, taken as indicated by section lines IV—IV in FIG. 3.

DETAILED DESCRIPTION OF THE INVENTION

FIGS. 1 and 2 show a computer system 10 including a disk drive mounting structure 12 built in accordance with the present invention, with FIG. 1 being a fragmentary cross-sectional side view, and with FIG. 2 being a fragmentary cross-sectional rear view, taken as indicated by section lines II—II in FIG. 1. The computer system 10 includes a frame 14 and a removable cover 16. The disk drive mounting structure 12 is pivotally mounted to the frame 14 by means of a pair of mounting brackets 18, each of which includes a hole 20 through which a pin 22 extends. The pins 22 are attached to extend outward from opposite sides 24 of the disk drive mounting structure 12. Each mounting bracket 18 is fastened to the frame 14 by means of a single screw 24 and nut 26, with an additional support being provided by a tab 28 extending as a part of the mounting bracket 18 through a slot 30 in the frame.

After the cover 16 is opened or removed, the drive mounting structure 12 is moved outward, in the direction indicated by arrow 31, through an intermediate position, indicated by dashed lines 32, into a fully open service position, indicated by dashed lines 34. With the drive mounting structure 12 in the service position, indicated by dashed lines 34, access is easily obtained, for example, to screws 36 mounting a disk drive 38 within the drive mounting structure 12, even when the disk drive mounting structure 12 extends between adjacent structures, such as a circuit card 40 and a power supply 42, shown as examples in FIG. 2. Moving the drive mounting structure 12 into the service position also provides access for plugging and unplugging a cable 43 extending to the disk drive 38, even when the disk drive mounting structure 12 extends into a position adjacent a structure 44.

When the disk drive mounting structure 12 is in its operating position, it is held in place, against rotating too far in the direction of arrow 31, by a pivoting support member 46, extending to rest against a lower panel 48 of the frame. When the cover 16 attached or closed, the disk drive mounting structure in its operating position held in place by the cover 16. Electrical grounding considerations may necessitate the use of cantilever contact springs extending between the drive mounting structure 12 and the cover 16.

The pivoting support member 46 is pivotally mounted on the disk drive mounting structure 12 by means of a pair of shoulder screws 50, and is pulled in the direction of arrow 52 by an extension spring 54 extending between a pin 56 attached to the disk drive mounting structure 12 and a pin 58 attached to the pivoting support member 46. A tab 60, extending outward as a portion of the disk drive mounting structure 12, limits the rotation of the pivoting support member 46 in the direction of arrow 52 through contact with an upward extending arm 62 forming a portion, of the pivoting support member 46. The upward extending arm 62 may also include an outward extending tab 64 providing a handle by which the pivoting support member 46 is manually moved opposite the direction of arrow 52 before the disk drive mounting structure 12 is manually rotated in the direction of arrow 31. This rotation of the pivoting support member 46 opposite the direction of arrow 31 causes the member 46 to be folded against the disk drive mounting structure 12, into a position, indicated by dashed lines 66 in which the pivoting support member 46 does not contact an adjacently disposed structure 67 as the disk drive mounting structure 12 is subsequently rotated in the direction of arrow 31.

Thus, the pivoting support member 46 is rotated between an extended position, in which it is shown contacting a frame wall 48, and a retracted position, in which it is moved against an adjacent surface of the disk drive mounting structure 12, as shown by dashed lines 66. This motion between the extended position and the retracted position occurs in a direction, opposite that of arrow 52, which is opposite the direction, indicated by arrow 31, in which the disk drive mounting structure 12 is subsequently moved between its operating position, in which it is shown, and its service position, indicated by dashed lines 34. In this way contact is prevented between the pivoting support member 46 and the adjacently disposed structure 67 by rotating the pivoting support member 46 away from the adjacently disposed structure 67 before the member 46 is pivoted toward the structure 67 with the motion pivoting the disk drive mounting structure 12.

FIGS. 3 and 4 show a variation of the present invention, with FIG. 3 being a fragmentary cross-sectional side view, and with FIG. 4 being a fragmentary plan view, taken as indicated by section lines IV—IV in FIG. 3. In accordance with this variation of the present invention, a frame 68 of the computing system is configured to include one or more inward extending tabs 70 forming motion limiting surfaces. The remaining structures, including the disk drive mounting structure 12 and the pivoting support member 46, are as described above in reference to FIGS. 1 and 2. After the disk drive mounting structure 12 is moved into the position in which it is shown in FIG. 1, when the pivoting support member 46 is moved in the direction of arrow 52, a tab 72 extending as a portion of the pivoting support member 46 is moved into position between the tabs 70 and an adjacent surface 74 of the frame 68. In this way, the disk drive mounting structure 12 is held, with rotation being prevented in both the direction of arrow 31 and the direction opposite this arrow 31, without a need to rely on contact with the cover 16.

The present invention allows the use of a member, such as the pivoting support member 46, which extends from a pivoted disk drive mounting structure, such as the structure 12, in a situation in which the member, if rigidly mounted to the pivoted disk drive mounting structure, would prevent the pivoting movement of the drive mounting structure through contact between the member and an adjacent structure. The adjacent structure may be a cabinet, such as that of a power supply, a circuit card, or a part of the system frame, which is overextended by the drive mounting structure. Since the pivoting support member of the present invention contacts an existing wall of the frame, such as the lower wall of the frame, the disk drive mounting structure can easily be provided as an option or an upgrade, requiring, in the example of FIGS. 1 and 2, only the holes required for mounting brackets 18, to be within the frame. Thus, the provision of a frame structure extending to meet the pivoting structure mounting a disk drive, in the manner described in the prior art patents, U.S. Pat. Nos. 5,172,205, 5,495,389, 5,784,251, 5,784,252, and 5,973,918.

While the invention has been described and shown as mounting a disk drive within a computing system, it is understood that the invention can readily be used to mount another type of device within a computing system to provide for its removal and replacement within a crowded area, without departing from the spirit and scope of the invention. In general, while the invention has been described in its preferred forms or embodiments with some degree of particularity, it is understood that this description has been given only by way of example, and that numerous changes, including the rearrangement of parts, may be made without departing from the spirit and scope of the invention.

What is claimed is:

1. Apparatus for holding a device within a computing system having a frame, wherein said apparatus comprises:
   a device holding structure for holding said device;
   a mounting structure pivotally mounting said device holding structure within said frame to move in a first pivoting direction between an operating position within said frame and a service position, wherein said device holding structure extends outward from said frame in said service position; and
   a support member pivotally mounted on said device holding structure to move in a second pivoting direction between an extended position and a retracted position, wherein said support member in said extended position extends to contact a surface of said frame to prevent movement of said device holding structure opposite said first pivoting direction past said operating position, and wherein said support member is moved toward an adjacent surface of said device holding structure into said retracted position.

2. The apparatus of claim 1, wherein said second pivoting direction is opposite said first pivoting direction.

3. The apparatus of claim 2, additionally comprising a spring providing a torque causing said support member to pivot opposite said second pivoting direction; and
   a surface of said device holding structure preventing movement of said support member opposite said second pivoting direction past said extended position.

4. The apparatus of claim 2, additionally comprising a motion limiting surface attached to said frame, wherein
   said motion limiting surface contacts said support member with said support member in said extended position to prevent movement of said device holding structure in said first pivoting direction from said service position, and
   said motion limiting surface clears said support member with said support member with said support member in said retracted position to allow movement of said device holding structure in said first pivoting direction from said service position.

5. A computing system including:
   a frame;
   a device holding structure holding a device, wherein said device holding structure is pivotally mounted within said frame to move in a first pivoting direction between an operating position within said frame and a service position, wherein said device holding structure extends outward from said frame in said service position;
   a support member pivotally mounted on said device holding structure to move opposite said first pivoting direction between an extended position and a retracted position, wherein said support member in said extended position extends to contact a surface of said frame to prevent movement of said device holding structure opposite said first pivoting direction past said operating position; and
   a structure attached to said frame, disposed adjacent said support member in said extended position with said device holding structure in said operating position, wherein movement of said device holding structure in said first pivoting direction from said operating position brings said support member held in said extended position into contact with said structure attached to said frame, and wherein said support member held in said retracted position clears said structure attached to said frame as said device holding structure is moved between said operating position and said service position.

6. The computing system of claim 5, wherein
additionally comprising
   a spring providing a torque causing said support member to pivot in said first second pivoting direction; and
   a surface of said device holding structure preventing movement of said support member in said first pivoting direction past said extended position.

7. The computing of claim 5, wherein
said frame additionally includes a motion limiting surface,
said motion limiting surface contacts said support member with said support member in said extended position to prevent movement of said device holding structure in said first pivoting direction from said service position, and
said motion limiting surface clears said support member with said support member with said support member in said retracted position to allow movement of said device holding structure in said first pivoting direction from said service position.

8. The apparatus of claim 5, additionally comprising a removable cover, wherein said removable cover held in place on said frame prevents movement of said device holding structure in said first pivoting direction from said operating position.

* * * * *